United States Patent
Drewery

(10) Patent No.: US 6,254,066 B1
(45) Date of Patent: Jul. 3, 2001

(54) APPARATUS FOR AERATING LIQUID IN A WASTEWATER TREATMENT TANK

(75) Inventor: T. Gig Drewery, Lumberton, TX (US)

(73) Assignee: Aqua Partners, Ltd., Lumberton, TX (US)

( * ) Notice: Subject to any disclaimer, the term of this patent is extended or adjusted under 35 U.S.C. 154(b) by 0 days.

(21) Appl. No.: 09/299,988

(22) Filed: Apr. 27, 1999

(51) Int. Cl.[7] .............................. B01D 47/16; C10J 1/18; F24F 3/14

(52) U.S. Cl. ........................................ 261/85; 261/DIG. 71

(58) Field of Search .................. 261/DIG. 71, 84–93

(56) References Cited

U.S. PATENT DOCUMENTS

| | | |
|---|---|---|
| 3,189,334 | * 6/1965 | Bell . |
| 3,778,233 | 12/1973 | Blough et al. . |
| 4,514,343 | * 4/1985 | Cramer . |
| 4,732,682 | * 3/1988 | Rymal . |
| 5,077,932 | * 1/1992 | Hetherington ................. 43/57 |
| 5,118,450 | * 6/1992 | Chiu . |
| 5,194,144 | 3/1993 | Blough . |
| 5,354,457 | * 10/1994 | Becchi . |
| 5,676,889 | * 10/1997 | Belgin ................................ 261/93 |

FOREIGN PATENT DOCUMENTS

3417039 * 11/1985 (DE) .

* cited by examiner

Primary Examiner—Chester T. Barry
(74) Attorney, Agent, or Firm—Harrison & Egbert

(57) ABSTRACT

An apparatus for aerating liquid in a wastewater treatment tank having a submergible motor with a shaft extending outwardly therefrom, a supporting member affixed to the submergible motor and adapted to maintain the submergible motor in a position within the liquid in the wastewater treatment tank, a propeller affixed to the shaft of the submergible motor, a housing extending around the propeller and the shaft, and an air tube connected to the housing and adapted to pass air interior of the housing between the propeller and the motor. The housing has a tubular configuration with a diameter slightly greater than the diameter of the propeller. The housing will extending beyond an end of the propeller opposite the shaft. The air tube extends so as to have one end affixed to the housing and communicating with an interior of the housing at an opposite end opening to an area outside of the liquid in the wastewater treatment tank.

12 Claims, 2 Drawing Sheets

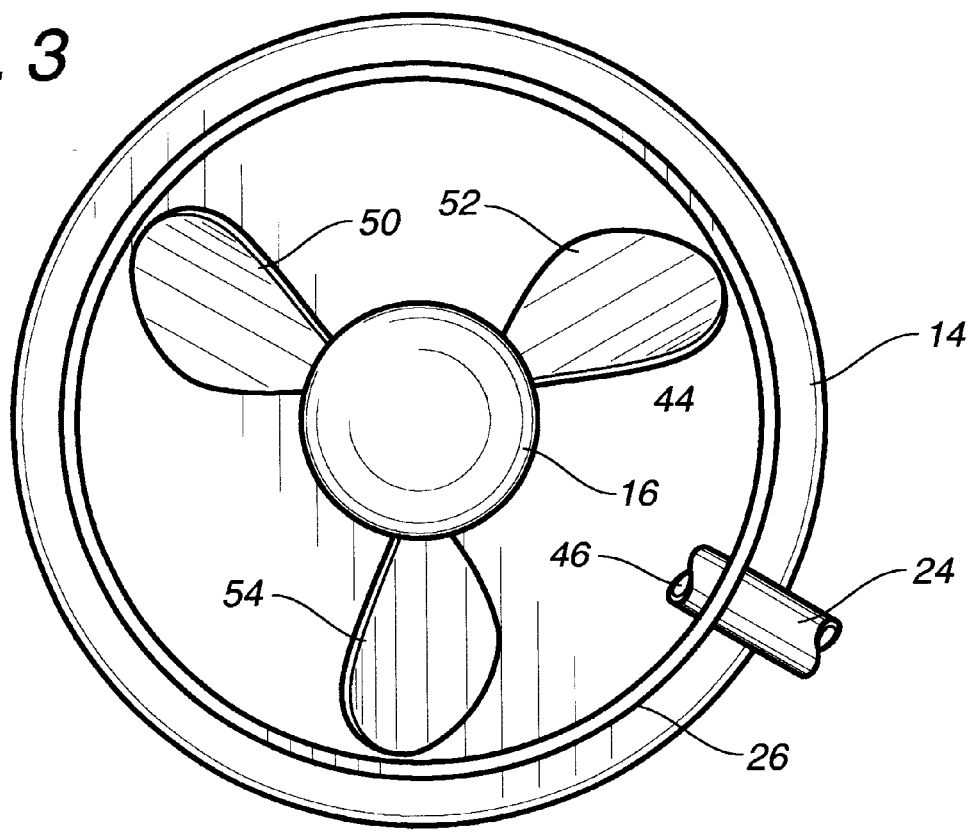

APPARATUS FOR AERATING LIQUID IN A WASTEWATER TREATMENT TANK

TECHNICAL FIELD

The present invention relates to devices for aerating liquids in wastewater treatment tanks. More particularly, the present invention relates to devices for improving aeration in septic tanks.

BACKGROUND ART

Advances in the general area of sewage treatment has resulted in the realization that, under properly controlled conditions, animal wastes and the like may be broken down into components that can be used as fertilizer or may be disposed of without creating either a health hazard or a pollution problem. Bacterial breakdown of sewage waste material is essentially performed by one of two basic processes; namely, aerobic and anaerobic. The latter process does not require oxygen and is therefore the prevailing process by which bacterial breakdown occurs where any substantial accumulation of waste is present, such as in manure lagoons (used by farmers to a limited extent), septic tanks, hog houses and the like. While manure or animal waste will eventually break down and be oxidized, the anaerobic process is accompanied by the production of noxious gases and has other disadvantages as well.

The aerobic process is performed by oxygen requiring aerobic material and has numerous advantages over the anaerobic process. For example, chemical breakdown is achieved by aerobic bacteria without the generation of objectionable odors. Moreover, the process does not attract flies or other vermin and the fertilizer value in the processed liquid is also retained. However, aerobic bacteria needs a constant supply of oxygen on which to thrive and, therefore, such aerobic systems require continuous replenishment of dissolved oxygen consumed by the aerobes in the waste material. Additionally, agitation is necessary to prohibit waste particles from settling out and resisting bacterial decomposition.

These requirements of aerobic systems have given rise to numerous mechanical aerators and agitators, including designs similar to those used in commercial sewage treatment plants. For example, devices have been created to aerate the material by rotating paddle wheels or the like which operate to either beat air into the material while moving it in the reservoir or to at least partially throw the material into the air. Other designs have incorporated separate means for moving the material in the reservoir and have introduced air by pumping compressed air through permeable "air stones" positioned at the bottom of the reservoir. The air stones are adapted to break the air into bubbles which enter the waste material. Bubbles are prepared over a stream of air passing through the material because the ratio of surface area to volume is greater and enables the oxygen to be more easily dissolved in the material. The proper function of an aerobic system is, of course, dependent upon the quantity of dissolved oxygen that is present within the waste material. It is seen that more power should be consumed by injecting larger than necessary quantities of oxygen into the material and, therefore, economic considerations are important in the manner in which oxygen is introduced. Another important economic consideration involves the manner in which the material is moved around or circulated within the reservoir.

In the past, certain U.S. patents have described various systems for the aeration of such septic tanks. For example, U.S. Pat. No. 3,778,233, issued on Dec. 11, 1973, to Blough et al., describes a device for aeration used primarily in confinement livestock operations to aerate sludge pits used in conjunction with the same. This apparatus included an elongated hollow shaft having a propeller secured to its lower end and driven at its upper end by a motor mounted on a swingable frame. Air enters the upper end of the shaft and exits adjacent the propeller. Rotation of the shaft and propeller induces air into the material. The shaft is immersed in the material at an angle to break the air into a multitude of fine bubbles while simultaneously moving the material around the reservoir. Since this device was designed under the circumstances of confinement feeding operations for livestock, such as hogs, there were limitations with the use of such device in conjunction with septic tanks that are used for storing human wastes.

One of the problems with sewage disposal plants, and septic tank plants, are that often the disposal system finds itself "contaminated" with non-organic non-biodegradable waste materials such as bandages, sanitary napkins, disposable diapers, condoms, and other material that people often discard into the lines of a sewage system. These adulterating materials could be drawn into the propeller of the aeration device described in U.S. Pat. No. 3,778,233. As a result, the propeller would become entangled in those materials and would plug the air tube lines. As a result, aeration would not be successfully achieved and, at best, the sludge material is simply stirred or agitated by the propeller with little effect on biodegradation.

In an effort to solve this problem, the inventor of U.S. Pat. No. 3,778,233 devised another apparatus for the aeration of septic tanks. This apparatus was described in U.S. Pat. No. 5,194,144, issued on Mar. 16, 1993. This patent describes an aeration device for septic tanks which includes an elongated shaft with a motor associated with the upper end of the shaft for rotating the shaft. An axial thrust propeller is rigidly attached to the shaft for rotation therewith. An air tube surrounds the shaft for drawing ambient air from the upper end of the shaft downwardly around the propeller when the propeller rotated in the septic tank waste so as to provide fine air bubbles. A guard bushing is concentrically positioned in the air tube to allow free escape of air bubbles into the agitated septic waste material to aerate such materials. The guard bushing was designed so as to prevent non-organic waste adulterants, such as non-biodegradable plastic and rubber materials, from being drawn into the propeller.

Unfortunately, this system can result in certain long-term problems associated with the treatment of such waste. The actual use of the guard bushing around the shaft will, over time, eventually become plugged with the waste materials. When the bushing becomes sufficiently plugged, it will eventually burn out the motor by the resistance to the rotation of the shaft of the motor. Additionally, this particular technique of introducing air does not allow for an easy control of the air flowing to the propeller. Furthermore, installation of such a device is quite complex. First, the concrete walls of the septic tank must be penetrated so as to create an opening for the apparatus. Once a hole is formed in the concrete, the device must be properly sealed to the walls of the treatment tank. If any flooding would occur within the wastewater treatment tank, such water could enter the interior of the chamber in which the motor is mounted so as to burn out the motor. Finally, complicated procedures would be required for maintenance and repair if the air tube should become plugged or the device would otherwise require replacement or repair.

It is an object of the present invention to provide an aeration device which can be easily mounted in association with existing septic tanks and wastewater treatment tanks.

It is another object of the present invention to provide an aeration device which will be water proof in the event of flooding.

It is a further object of the present invention to provide an aeration device which does not require the formation of an extra entrance hole on the wastewater treatment tank.

It is a further object of the present invention to provide an aeration system which uses existing riser openings associated with the wastewater treatment tank.

It is a further object of the present invention to provide an aeration device which avoids the use of any bushing materials which can be subject to plugging or failure.

It is still another object of the present invention to provide an aeration device for a wastewater treatment tank which allows for a simple control of air flow to the wastewater.

It is still another object of the present invention to provide an aeration device which can be easily accessed, simpler to use, easier to mount, simple to manufacture, and relatively inexpensive.

These and other objects and advantages of the present invention will become apparent from a reading of the attached specification and appended claims.

SUMMARY OF THE INVENTION

The present invention is an apparatus for aerating the liquid in a wastewater treatment tank comprising a submergible motor having a shaft extending outwardly therefrom, a supporting member affixed to the submergible motor and adapted to maintain the submergible motor in a position in the liquid in the wastewater treatment tank, a propeller affixed to the shaft of the submergible motor, a housing extending around the propeller and the shaft, and an air tube connected to the housing and adapted to pass air interior of the housing.

In the preferred embodiment of the present invention, the housing is a tubular configuration having a diameter slightly greater than a diameter of the propeller. The housing is coaxial with the shaft. The housing has one end affixed to an end of the submergible motor opposite the supporting member and extending beyond the propeller opposite the shaft.

In the preferred embodiment of the present invention, the air tube extends so as to have one end affixed to the housing and communicating with an interior of the housing. The air tube has an opposite end opening to an area outside of the liquid within the wastewater treatment tank. The air tube can be affixed to the submergible motor and extend along the supporting member. Preferably, the air tube is a flexible tube.

In the present invention, the shaft associated with the submergible motor has a length of no more than two inches extending outwardly of the motor. The shaft extends outwardly of the motor on an end opposite the supporting member. The shaft is unsupported by bushings exterior of the motor. The supporting member has an end opposite the motor adapted to be removably affixed within the riser opening of the wastewater treatment tank. The motor has an electrical power line extending therefrom and along the supporting member. The electrical power line is adapted to be connected to a source of electrical power exterior of the wastewater treatment tank.

BRIEF DESCRIPTION OF THE DRAWINGS

FIG. 3 is a bottom view showing the relationship of propeller, shaft, housing and motor as used in the present invention.

DETAILED DESCRIPTION OF THE PRESENT INVENTION

Figure 1:
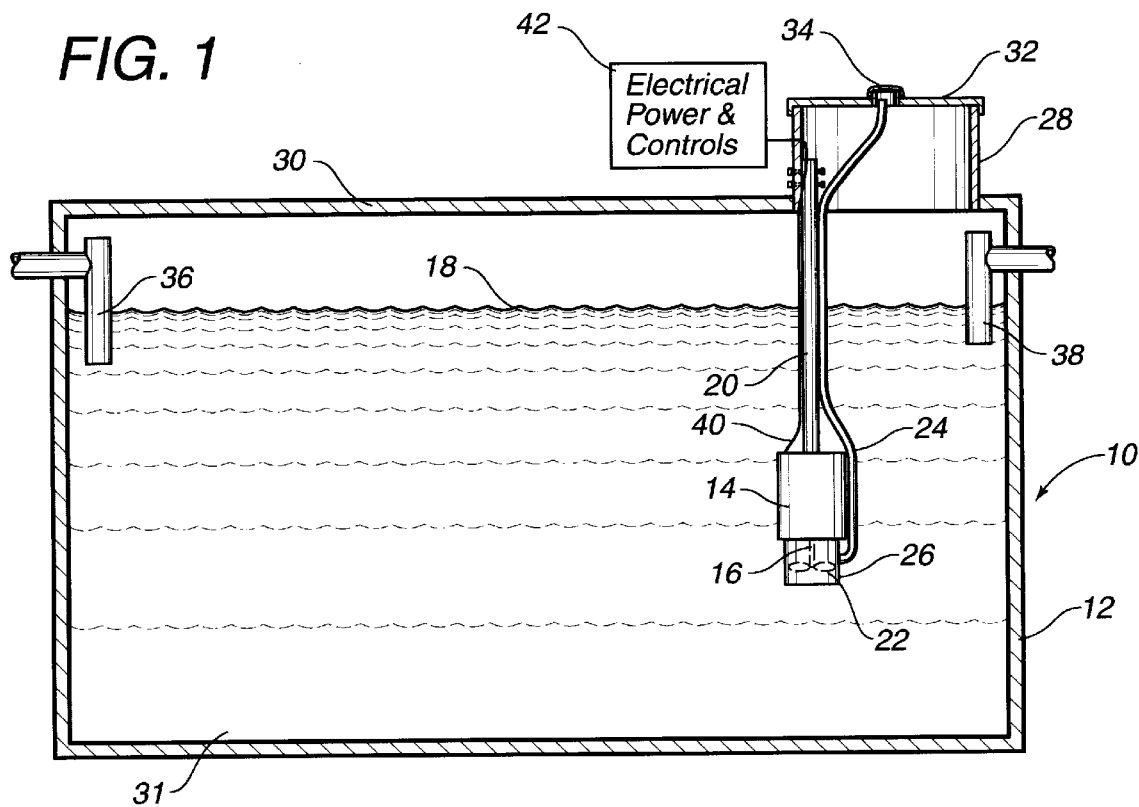
FIG. 1 is a cross-sectional view showing the aeration device of the present invention as used within a wastewater treatment tank.

Referring to FIG. 1, there is shown at 10 the wastewater treatment system in accordance with the preferred embodiment of the present invention. The wastewater treatment system 10 includes a wastewater treatment tank 12, a submergible motor 14 having a shaft 16 extending outwardly therefrom and positioned within the liquid 18 within the wastewater treatment tank 12, a supporting member 20 affixed to the submergible motor 14 and adapted to maintain the submergible motor 14 within the liquid 18 in the wastewater treatment tank 12, a propeller 22 affixed to the shaft 16, and an air tube 24 connected to the housing 26 extending around the propeller 22. The air tube 24 is adapted to pass air interior of the housing 26 between the propeller 22 and the motor 14. As used herein, the term "supporting member" can refer to any structure used to maintain the submergible water in the waste water, such bars, rods, struts, structures, ropes, cables, chains and similar items.

In the present invention, the wastewater treatment tank 12 has a riser opening 28 located on the top 30 of the wastewater treatment tank 12. The riser opening 28 is designed so as to allow access to the interior volume 30 of the wastewater treatment tank 12. The submergible motor 14, the supporting member 20, the housing 26, and the propeller 22 are located directly below the riser opening 28. A cover 32 extends over the top opening of the riser opening 28. A vent cap 34 is formed on the cover 32. It can be seen that the air tube 24 extends so as to be connected to the vent cap 34. The vent cap 34 on the cover 32 associated with riser opening 28 can be a valve so as to allow for the flow of air through the air tube 24.

In FIG. 1, it can also be seen that the wastewater treatment tank 12 has an inlet 36 and an outlet 38. The inlet 36 can be connected to a source of wastewater, such as a home or commercial establishment. The wastewater will flow into the interior volume 30 of the wastewater treatment tank 12 and rise to the level of the liquid 18 shown in FIG. 1. As the liquid rises to a desired level, it will exit through the outlet 38 for further disposal, treatment, or irrigation purposes. It is the purpose of the present invention to provide aeration to the wastewater 18 within the interior volume 30 of the wastewater treatment tank 12. Within the concept of the present invention, it is important to be able to thoroughly aerate the wastewater 18 without turbulence. Any turbulence introduced into the wastewater 18 will tend to disturb the settling of solid wastes from the liquid 18. It has been found that the present invention will produce a steady stream of extremely small air bubbles which flow thoroughly throughout the wastewater 18 without creating sufficient turbulence to disturb the settling activity of solid particles from the liquid waste 18.

The submergible motor 14 is of a type which is commonly used in oilfield operations. The submergible motor 14 is suitably encapsulated so as to prevent any liquids from intruding into the interior of the motor 14. As such, the motor 14 is capable of operating in a completely liquid environment. The motor 14 has a small shaft 16 extending outwardly therefrom. The motor 14 should have relatively small power requirements. Within the preferred embodiment of the present invention, the motor 14 will operate at approximately $\frac{1}{15}$th horsepower capacity. However, the size and power of the motor 14 can be suitably adjusted and varied so as to fit the aerobic requirements of the wastewater treatment system 10. A power line 40 will extend from the motor 14 along the supporting member 20 so as to be connected to a source of electrical power 42 exterior of the wastewater treatment tank 12. The electrical line 40 should be waterproof cable which extends to the riser opening 28 and outwardly through a hole formed in the riser opening 28. The power line 40 can be affixed to the supporting member 20 and extend therealong to the submergible motor 14.

As can be seen in FIG. 1, the housing 26 is affixed to the end of the motor 14 opposite the supporting member 12. The housing has a generally tubular configuration with a diameter slightly greater than the diameter of the propeller 22. The housing 26 will be coaxial with the shaft 16. The housing 26 will extend downwardly beyond the bottom of the shaft 16 and the bottom of the propeller 22. It can be seen that the shaft 16 is unsupported by bushings within the housing 26. As such, the present invention avoids the problems associated with bushings becoming clogged with foreign materials from the wastewater 18. By avoiding any clogging of bushings, the power requirements from the motor 14 will be consistent throughout its use. Repair and replacement of the bushings will be unnecessary. The use of bushings is avoided by the use of a relatively short shaft 16, being approximately two inches in length and no more than six inches in length. The connection between the shaft 16 and the motor 14 will prevent any cantilever effects from occurring.

The supporting member 20 is a rigid strut which has one end attached, by various means, to the submergible motor 14. The supporting member 20 can, in particular, be attached to the submergible motor 14 by bolting, adhesives, welding, or by any other conventional mechanism. The supporting member 20 extends upwardly through the wastewater 18 so as to have an end affixed to the wall of the riser opening 28. As illustrated in FIG. 1, the supporting member 20 is bolted to the riser opening 28. However, the upper end of the supporting member 20 can be attached by various other means, such as clamps, screws, brackets, clips, or other mechanisms to the riser opening 28. It is desirable that the supporting member 20 be removably affixed to the riser opening 28 so that repair and replacement of the submergible motor 14 can occur without undue difficulty. For repair and replacement, it is only necessary to remove the bolts attached to the supporting member 20 and to simply lift the submergible motor 14, and its associated components, from the interior volume 30 of the wastewater treatment tank 12. The supporting member 20 also provides a support for the attachment and extension of the power line 40 and the air tube 24.

The air tube 24 extends along the supporting member 20 so as to have one end affixed to the housing 26 and communicating with an interior of the housing 26. The air tube 24 will have its opposite end opening to an area exterior of the wastewater 18. By the attachment of the opposite ends to the vent cap 34, easy control of the flow of air to the housing 26 can be achieved without complicated mechanisms. The air tube 24 can be a flexible plastic tube. The air tube 24 can, if desired, be secured to the exterior of the motor 14 by clips, clamps, adhesives, tape, or bands. The air tube 24 can also be secured to the supporting member 20 by similar mechanisms.

Figure 2:
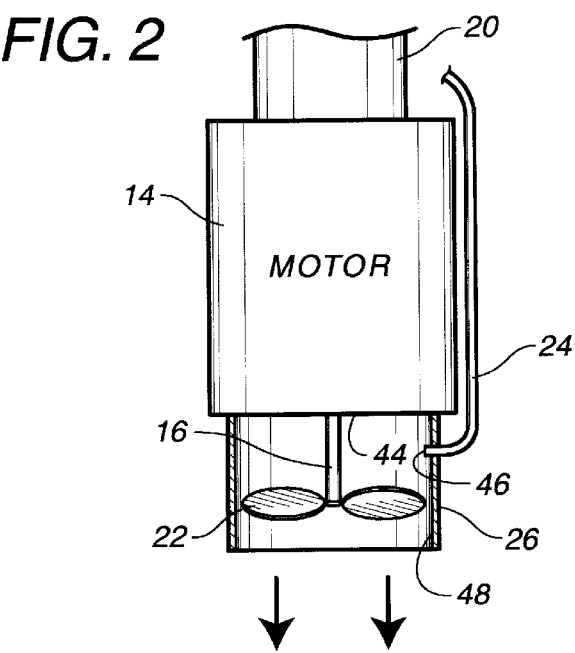
FIG. 2 is a detailed illustration of the aeration device in accordance with the preferred embodiment of the present invention.

FIG. 2 shows a detailed view of the motor 14 and its relationship to the housing 26. It can be seen that the housing 26 has a generally tubular configuration which extends downwardly below a bottom 44 of the submergible motor 14. The air tube 24 has an end 46 which opens into the area within the housing 24 between the propeller 22 and the bottom 44 of the motor 14. The shaft 16 will extend from the center of the propeller 22 to the interior of the motor 14. Supporting member 20 will support the motor 14 in its desired position.

When the propeller 22 rotates, air is drawn along the air tube 24 into the space between the propeller 22, the interior of the housing 26 and the bottom 44 of motor 14. At the interface between the rotating propeller 22 and the downwardly moving air (indicated by the arrows in FIG. 2), an extreme amount of agitation and disruption occurs such that the air will pass outwardly from the bottom opening 48 of the housing 26 and into the wastewater 18 in the form of extremely small air bubbles. This provides the maximum amount of aeration, since the smaller the bubbles, the more the exposure of the wastewater 18 to the oxygen within the air bubbles. Generally, with the present invention, the dissolved oxygen content within the tank 12 can be kept between 6 ppm and 10 ppm at all times. This is sufficient to convert immediately all soluble organic material into digested waste material suitable for transfer to a holding tank or for use as a fertilizer material. As a fertilizer material, the aerated wastewater 18 will contain nitrates and phosphates and extremely fine particles of non-biodegradable solids. The air or oxygen flow passing through the propeller 22 and outwardly of the housing 26 through the bottom 48 (as illustrated by the arrows in FIG. 2) will create a moving thrust of downwardly moving air so as to interface with the wastewater 18. This high degree of agitation will result in a finer mist of air bubbles being dispersed throughout the wastewater within the tank 12.

In FIG. 3, it can be seen that the housing 26 is arranged in concentric relationship with the shaft 16. Propeller blades 50, 52 and 54 will extend radially outwardly of the shaft 16. The diameter of the propeller blades 50, 52 and 54 will be slightly less than the interior diameter of the housing 26. It should be noted that any number of propeller blades can be used within the concept of the present invention. The desired arrangement of propeller blades 50, 52 and 54 would be in the form of axial thrust propellers. The air tube 26 has an end 46 which will open into the interior of the housing 26. As such, the desired amount of air will flow into the region between the bottom 44 of motor 14 and the top of the propeller blades 50, 52 and 54. In FIG. 3, it can be seen that the air tube 26 has end 46 extending through the wall of the housing 26. Alternatively, the end 46 can be mounted onto a hole formed on the housing 26. It is not required that the end 46 penetrate through the wall of the housing 26.

The present invention achieves numerous advantages over the prior art. In particular, the present invention, through the use of a submergible motor, presents a simpler solution to the introduction of air bubbles into a septic tank than does the prior art. The use of a submergible motor will, inherently, avoid any problems associated with flooding. Since the motor is designed to operate in a water-filled environment, it is not possible for water to penetrate the walls of the motor so as to burn out the motor. Since the motor is mounted directly in the wastewater, it is easier to install on the septic tank. There is no need to create entrance holes. By attaching to the existing riser opening, the aeration device of the present invention can be easily retrofitted to existing wastewater treatment tanks. The present invention avoids bushing wear out or plugging. As such, the present invention minimizes the amount of repair that would be necessary to the aeration device. By simply extending an air line from the housing to the riser opening, the present invention allows for a much easier control of air flow. A suitable air admitting valve can be formed with the vent cap 34 so as to allow for a very easy control of air flow. Removal and repair is made simpler by the fact that the device, along with the air tube, the power line and the supporting member are arranged at the riser opening. it is only necessary to unbolt the supporting member 20 from the riser opening, pull the motor 14 and its associated components upwardly, and then carry out the requisite repairs.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. An apparatus for aerating liquid in a wastewater treatment tank, the apparatus comprising:

a submergible motor having a shaft extending outwardly therefrom;

a supporting member affixed to said submergible motor, said supporting member adapted to maintain said submergible motor entirely in the liquid within the wastewater treatment tank;

a propeller affixed to said shaft of said submergible motor;

a housing extending around said propeller and said shaft, said housing having one end sealingly affixed to an end of said motor opposite said supporting member, said housing extending beyond an end of said propeller opposite said shaft, said housing being closed between said propeller and said end of said motor so as to prevent the liquid from flowing through said housing into a space between said propeller and said end of said motor; and an air tube connected to a space between said submergible motor and said propeller and adapted to pass air interior of said housing.

2. The apparatus of claim 1, said air tube extending so as to have one end affixed to said housing and communicating with an interior of said housing between said propeller and said motor, said air tube having an opposite end opening to an area outside of the liquid in the wastewater treatment tank.

3. The apparatus of claim 1, said air tube being affixed to an exterior of said motor and extending along said supporting member.

4. The apparatus of claim 1, said air tube being a flexible tube.

5. A wastewater treatment system comprising:

a wastewater treatment tank having an interior volume suitable for receiving wastewater therein, said wastewater treatment tank having a riser opening at a top thereof, said riser opening allowing access to said interior volume;

a submergible motor having a shaft extending outwardly therefrom, said submergible motor positioned directly below said riser opening;

a supporting member affixed to said submergible motor so as to position said submergible motor within said interior volume of said wastewater treatment tank, said supporting member having an end removably affixed adjacent said riser opening;

a propeller affixed to said shaft of said submergible motor;

a housing extending around said propeller and said shaft; and an air tube connected to a space between said motor and said propeller and adapted to pass air interior of said housing.

6. The system of claim 5, said air tube having an end opposite said housing, said end of said air tube opening in an area of said riser opening.

7. The system of claim 6, said riser opening having a cover extending thereover, said cover being removably affixed to said wastewater treatment tank, said end of said air tube being connected to a vent cap formed on said riser opening or said cover.

8. The system of claim 7, said vent cap being a valve adapted to control a volume of air passing through said air tube to said space between said motor and said propeller.

9. The apparatus of claim 5, said wastewater treatment tank being a septic tank.

10. The system of claim 5, said housing having a tubular configuration with a diameter slightly greater than a diameter of said propeller, said housing being coaxial with said shaft, said housing having one end affixed to said submergible motor, said housing extending beyond an end of said propeller opposite said shaft.

11. The system of claim 5, said air tube extending so as to have one end affixed to said housing and communicating with an interior of said housing between said motor and said propeller, said air tube having an opposite end opening to an area outside of said interior volume of said wastewater treatment tank.

12. The system of claim 5, said shaft having a length of no more than six inches extending outwardly of said motor, said shaft extending outwardly of said motor on an end opposite said supporting member, said shaft being unsupported by a bushing exterior of said motor.

* * * * *